United States Patent
Truong

(10) Patent No.: US 7,814,309 B1
(45) Date of Patent: Oct. 12, 2010

(54) METHOD FOR CHECKPOINTING AND RECONSTRUCTING SEPARATED BUT INTERRELATED DATA

(75) Inventor: Steve H. Truong, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/515,809

(22) Filed: Feb. 29, 2000

(51) Int. Cl.
*H04L 29/06* (2006.01)

(52) U.S. Cl. ...................................... 713/153
(58) Field of Classification Search ................. 709/224, 709/223; 713/153
See application file for complete search history.

(56) References Cited

U.S. PATENT DOCUMENTS

| | | | | |
|---|---|---|---|---|
| 5,606,668 A | * | 2/1997 | Shwed | 713/201 |
| 5,623,601 A | * | 4/1997 | Vu | 713/201 |
| 5,689,566 A | * | 11/1997 | Nguyen | 713/155 |
| 5,748,882 A | * | 5/1998 | Huang | 714/47 |
| 5,805,804 A | * | 9/1998 | Laursen et al. | 709/223 |
| 5,826,014 A | * | 10/1998 | Coley et al. | 713/201 |
| 5,907,678 A | * | 5/1999 | Housel et al. | 709/213 |
| 6,041,054 A | * | 3/2000 | Westberg | 370/389 |
| 6,061,797 A | * | 5/2000 | Jade et al. | 726/15 |
| 6,151,679 A | * | 11/2000 | Friedman et al. | 713/201 |
| 6,735,205 B1 | * | 5/2004 | Mankude et al. | 370/395.32 |

OTHER PUBLICATIONS

Secure random number cryptography software, 2002-3, D.I. Management Services Pty Limited.*
Lehman, Li-wei H et al., "Active Reliable Multicast", 1998, IEEE, pp. 581-589.*
Wang, Y.M. et al., Integrating Checkpointing with Transaction Processing, 1997, IEEE p. 304-308.*

* cited by examiner

*Primary Examiner*—Christopher J Brown
(74) *Attorney, Agent, or Firm*—Cesari and McKenna, LLP

(57) ABSTRACT

A method is disclosed whereby separate but interrelated data is checkpointed and reconstructed within a router. In one embodiment, each connection is checkpointed with a unique connection identifier, and critical data is stored by a firewall application in a checkpoint server provided within a router. When an application module within the firewall crashes, the firewall and associated modules may recover and restore the data from the checkpoint server by re-assembling the data according the unique connection identifier, thus recovering the connections through the router without interruption.

20 Claims, 11 Drawing Sheets

Connection Recovery
According to the Present Invention

Unique Checkpointing
According to the Present Invention

Connection Recovery
According to the Present Invention

Unique Checkpointing
According to the Present Invention

Unique Checkpointing
According to the Present Invention

Unique Checkpointing
According to the Present Invention

Interrelated Data Recovery
According to the Present Invention

Interrelated Data Recovery
According to the Present Invention

METHOD FOR CHECKPOINTING AND RECONSTRUCTING SEPARATED BUT INTERRELATED DATA

BACKGROUND OF THE INVENTION

1. Field of the Invention

The present invention relates to data communications. In particular, the present invention relates to firewall applications running within routers.

2. The Prior Art

Background

The ability to transport large amounts of critical data over a network in a reliable manner is of critical importance today. Applications such as streaming video, live audio, or teleconferencing all place high demands on networks such as the Internet. When a system carrying such data crashes, critical communications may be lost and users frustrated.

FIG. 1 shows an example of a prior art communications system. FIG. 1 shows a sender and a receiver connected to a network cloud. For purposes of this disclosure, the sender and receiver may be any standard electronic devices which desire to communicate through an electronic network such as the Internet, a Local Area Network (LAN), or a Wide Area Network (WAN).

To the end user, the operation of the system in FIG. 1 should be transparent and error free. For example, an end user (receiver) watching streaming video originating from a video server (sender) should never know what is taking place within the network cloud that makes the process possible.

FIG. 2 is a more detailed diagram of a prior art communications system. FIG. 2 expands on the detail of FIG. 1 by showing an example of communications occurring over a standard Internet connection. FIG. 2 includes a host and a server connected to a network cloud comprising a plurality of routers. In FIG. 2, the host wishes to transmit a packet P to the server. As is known by those of ordinary skill in the art, when the packet P arrives at router 1, the router 1 will encode the packet P with a unique identifier containing the source and destination addresses. Then router 1 will forward the packet P to the destination through other routers according to standard routing protocols. In this example, router 1 will forward packet P to router 4, which will then forward the packet P to the ultimate destination, which in our example here is the server.

One problem encountered in the prior art is how to ensure the reliability of the connection between the source and destination when one or more components or processes running within routers along the path of the packet fail.

FIG. 3 is a conceptual block diagram of a typical prior art router. A typical prior art router may have a plurality of input ports and a plurality of output ports connected through a switching fabric which forms the heart of the router. Routers will typically have a routing processor containing standard hardware and software, and may also contain a firewall application standard in the art as shown in FIG. 3.

In operation, when a packet appears at an input port such as input port 1 in FIG. 3, the firewall application will first examine the packet to see if the packet is safe to route through. If the packet is safe, then the routing processor will route the packet through the switching fabric to the appropriate output port, such as output port 1 as shown in FIG. 3.

As is known by those of ordinary skill in the art, the function of a firewall application is to protect the network from unauthorized access, and from problems such as broadcast storms. To accomplish this, firewall applications typically monitor packets passing through the router and block access to those packets deemed undesirable. Since all packets which flow through the router must necessarily pass through the firewall application, the firewall application must be able to understand the wide variety of protocols that are in use. Furthermore, since firewall applications may be programmed to block access to a particular address, the firewall application must also keep track of who is sending what packet to whom through the router.

During the process described in FIG. 3, various modules may be required to operate within the firewall application to attend to each individual connection.

Referring now to FIG. 4A, a diagram showing the organizational hierarchy for the various modules that may be running within the firewall is presented. As is known by those of ordinary skill in the art, for the firewall application to properly carry out its functions, it must use a data structure to represent the end-to-end connections that it must monitor. This connection data structure reflects the modular content of the firewall application and typically contains portions that are maintained by the various modules within the firewall application that which are responsible for their respective parts of the communication protocol.

For example, the transport level portion of the connection data structure contains transport-related states of the connection. The application level portion contains application-related states and context information. Thus, the composition of the connection data structure depends on the end-to-end application.

Consequently, in the example described above, the firewall application will need to know the source and destination address contained in the base layer, the level 4 protocol types such as TCP and UDP that the connection may be utilizing, and the level 7 protocols the connection may be utilizing, such as video conferencing or FTP. During the life span of each connection, a separate connection data structure will be created within the firewall application for each individual connection made through the router which contains critical information regarding each individual connection running through the router.

Referring now to FIG. 4B, a diagram showing how the connection data structure is stored by the firewall in the prior art is presented. FIG. 4B also shows a detail illustration of the firewall application memory space for connections 1 through n.

As shown by FIG. 4B, the firewall memory space contains data for each connection running on the router. During the lifespan of each connection, a separate data connection structure is created that contains data for the base layer for each connection, as well as data for each module that is running to service the connection.

However, the individual data for each module does not contain an indication therein regarding which individual connection the module is related to. Thus, the firewall application memory space contains separate but interrelated data with no indication of how the data is interrelated. In other words, while the connection data structure is being stored in manner suitable for a crash-free environment, it is not being stored in an organized and robust manner that may be reassembled should a failure occur.

As is known by those of ordinary skill in the art, the connection information contained in the firewall application's memory space is crucial to the proper operation of the router and firewall application. However, currently there is no method to safeguard this data in the event of a failure of the firewall application. Therefore, if a firewall application should crash, all of the information contained in the firewall application's memory space is lost, and the firewall application will lose track of all of the connections on the router, and all connections on the router will have to be rebuilt. Consequently, if a user is connected to a video server as in the above example, the streaming video will be lost should the firewall application crash.

Additionally, while the connection data structure may be stored and retrieved as a whole, this may not be possible or desirable where each component of the firewall application is configured in a modular fashion This may occur by way of example where each component of the firewall application is configured to checkpoint its own data structure independently of the other modules running within the firewall application.

Hence, there is a need for a system to preserve the connection data structure of a firewall application running within a router.

Also, there is a need for a method for recovering the connection data structure when a firewall application composed of independent modules crashes.

Also, there is a need for a method to recover the connection data structure when a firewall application crashes.

Furthermore, there is a need to satisfy the above needs in a manner that is transparent to the user.

BRIEF DESCRIPTION OF THE INVENTION

The invention satisfies the above needs. The present invention relates to data communications. In particular, the present invention relates to firewall applications running within routers.

A method for uniquely checkpointing data is disclosed, comprising: providing a checkpoint server; creating a unique connection identifier corresponding to each at least one connection through the router; checkpointing data regarding the connection through the router within the checkpoint server; and encoding the checkpointing data within the checkpoint server with the corresponding unique connection identifier.

A method for reassembling separate but interrelated data stored according to the previous process is disclosed, comprising: recovering the checkpointing data; and reassembling the checkpointing data according to the unique connection identifier.

Specific aspects of the invention relate to firewall applications running within router, and increase reliability and availability of routers by reducing connection loss.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. In particular, the present invention relates to firewall applications running within routers. It is contemplated that the present invention may by embodied in various computer and machine readable data structures. Furthermore, it is contemplated that data structures embodying the present invention will be transmitted across computer and machine readable media, and through communications systems by use of standard protocols such as those used to enable the Internet and other computer networking standards.

The invention further relates to machine readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

To create the embodiments disclosed herein, a two-step process is described below. First, a process will disclosed whereby critical connection data will be uniquely checkpointed. Second, a process will be disclosed whereby the uniquely checkpointed data will be reassembled should a crash occur. Each process will now be taken in turn.

Checkpoint Server

Figure 5A:
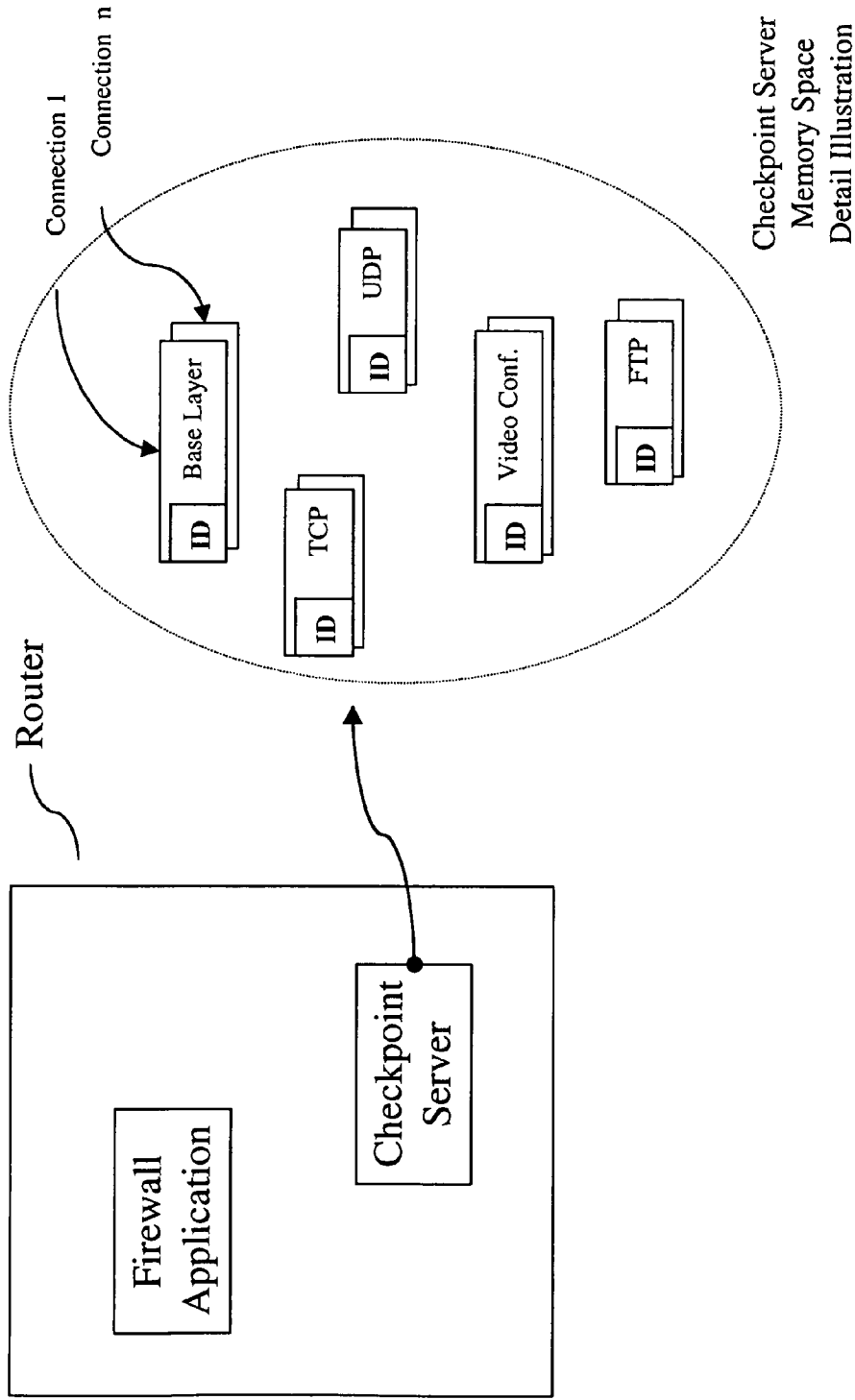
FIG. 5A is a diagram of a unique checkpointing and a checkpoint server memory space detail illustration according to the present invention.

The present invention introduces the concept of a checkpoint server. FIG. 5A is a block diagram of a checkpoint server according to the present invention. The checkpoint server is provided to accomplish the unique checkpointing and interrelated data recovery described below. In a non-limiting exemplary embodiment, the checkpoint server runs on the microprocessor, chipset, and associated circuitry used by the router server, and utilizes memory space provided by the router. However, it is contemplated that the checkpoint server may also run on any standard microprocessor, chipset, and associated circuitry known on the art, and may use any memory storage means, such as RAM, magnetic storage media, optical storage media, or removable storage media.

FIG. 5A shows the checkpoint server running along side the firewall application within a router according to a preferred embodiment of the present invention. It is contemplated that the checkpoint server may also run within any other application where reliability and availability to an end user is critical.

FIG. 5A further shows a checkpoint server memory space detail illustration. According to preferred embodiment of the present invention, memory space is provided within the checkpoint server to store the contents shown in FIG. 5A. As mentioned above, the memory space may comprise any storage means known in the art.

The checkpoint server memory space detail illustration of FIG. 5A provides an excellent overview of one aspect of the present invention. Within the checkpoint memory space, each module running within the firewall application stores, or checkpoints, data relating to a separate connection established on the router. The checkpoint memory space thus contains the contents of the connection data structure mentioned above in the prior art section, with portions of a connection data structure stored at interrelated locations reflecting the independent checkpointing activities of the modules within the firewall application.

Figure 1:
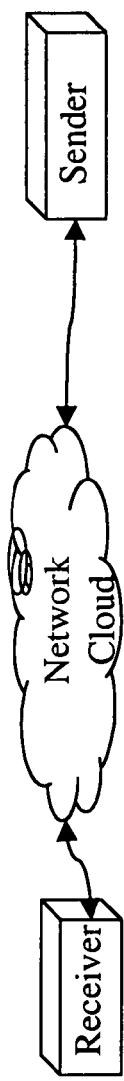
FIG. 1 is a prior art diagram of a communications system.
Figure 2:
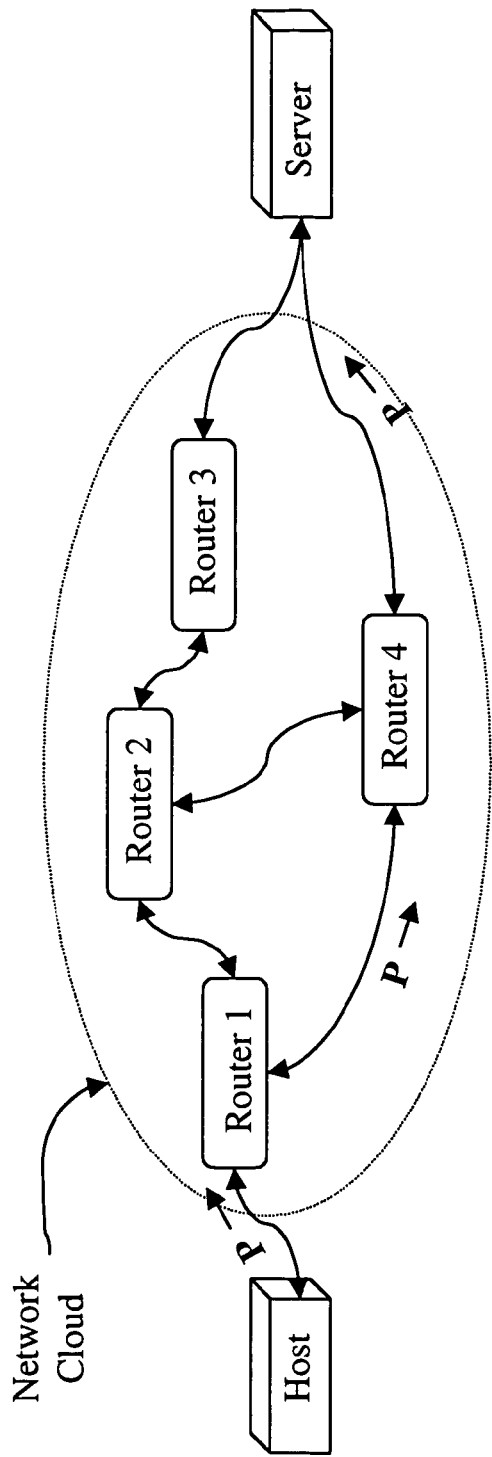
FIG. 2 is a prior art diagram of a communications system.
Figure 3:
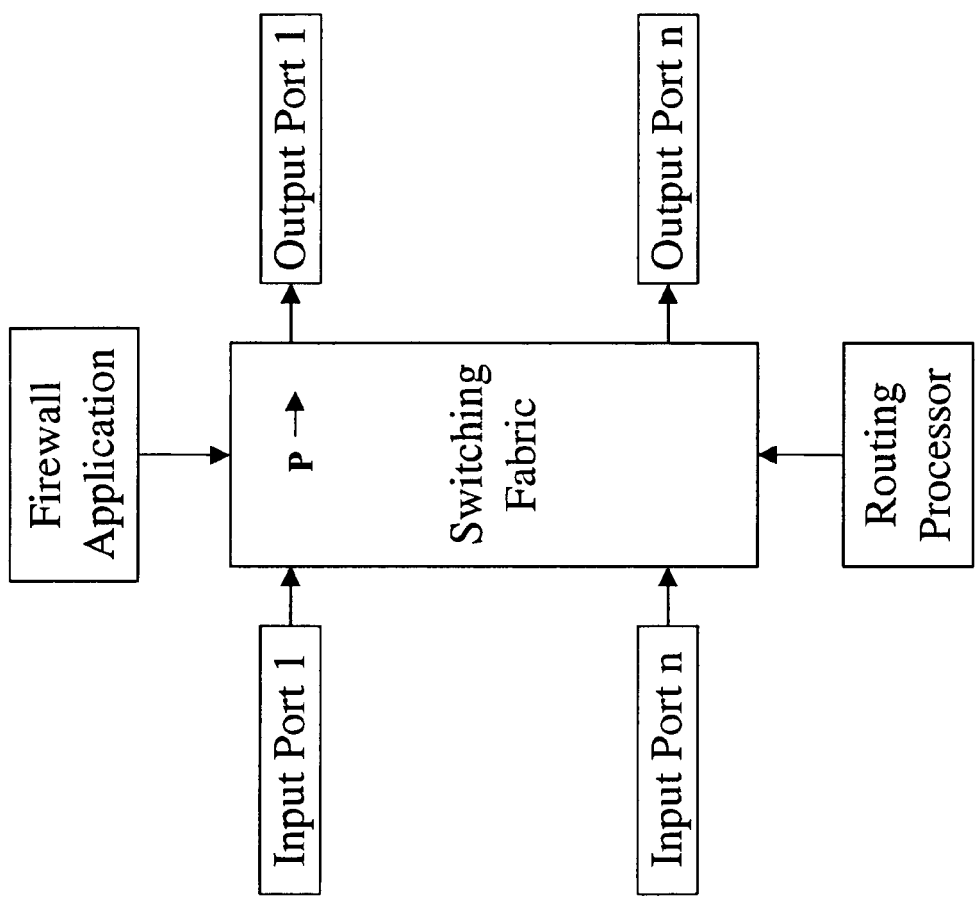
FIG. 3 is a prior art diagram of a communications system containing a router and firewall application.
Figure 4A:
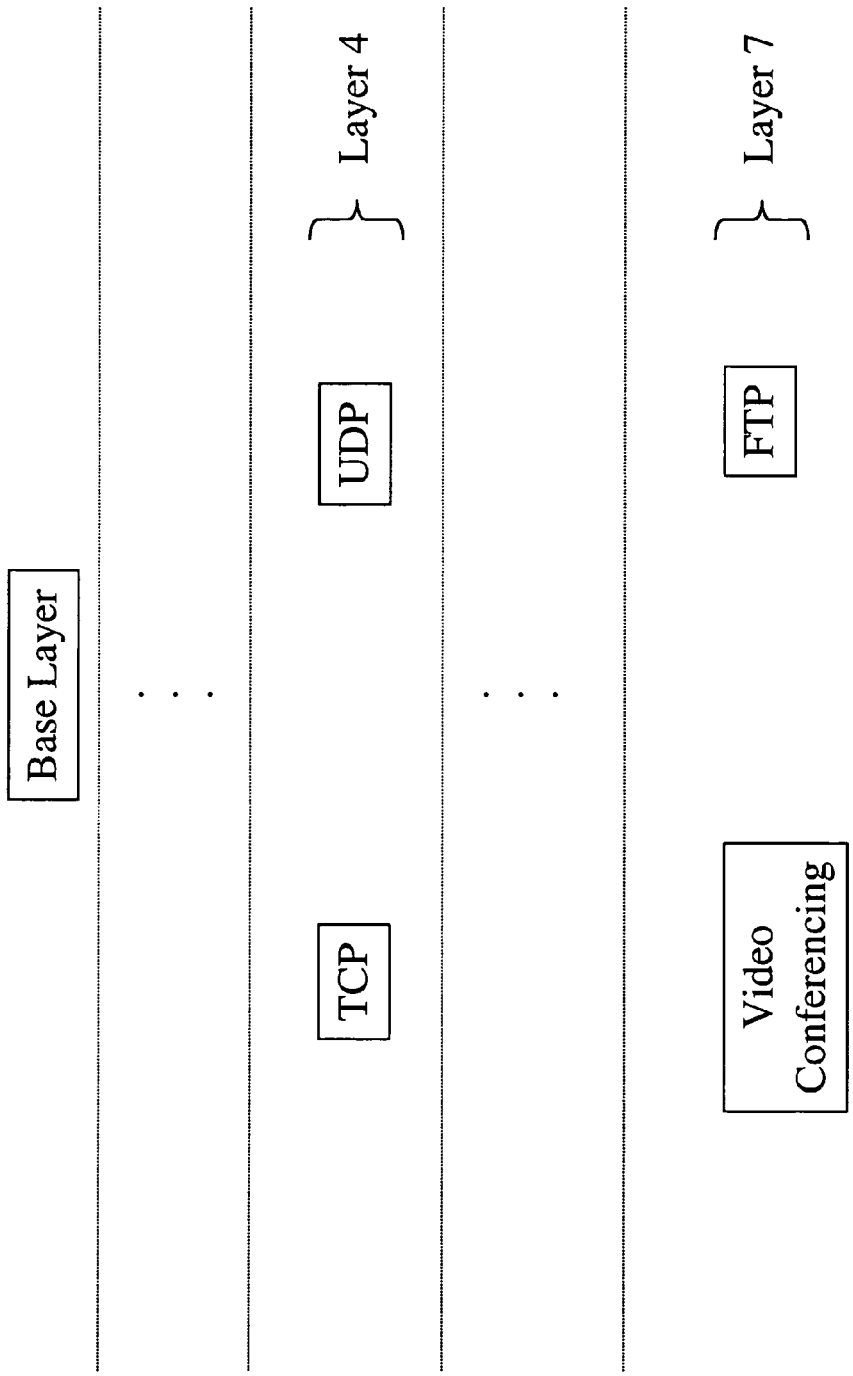
FIG. 4A is a prior art diagram of connection data stored within a router.
Figure 4B:
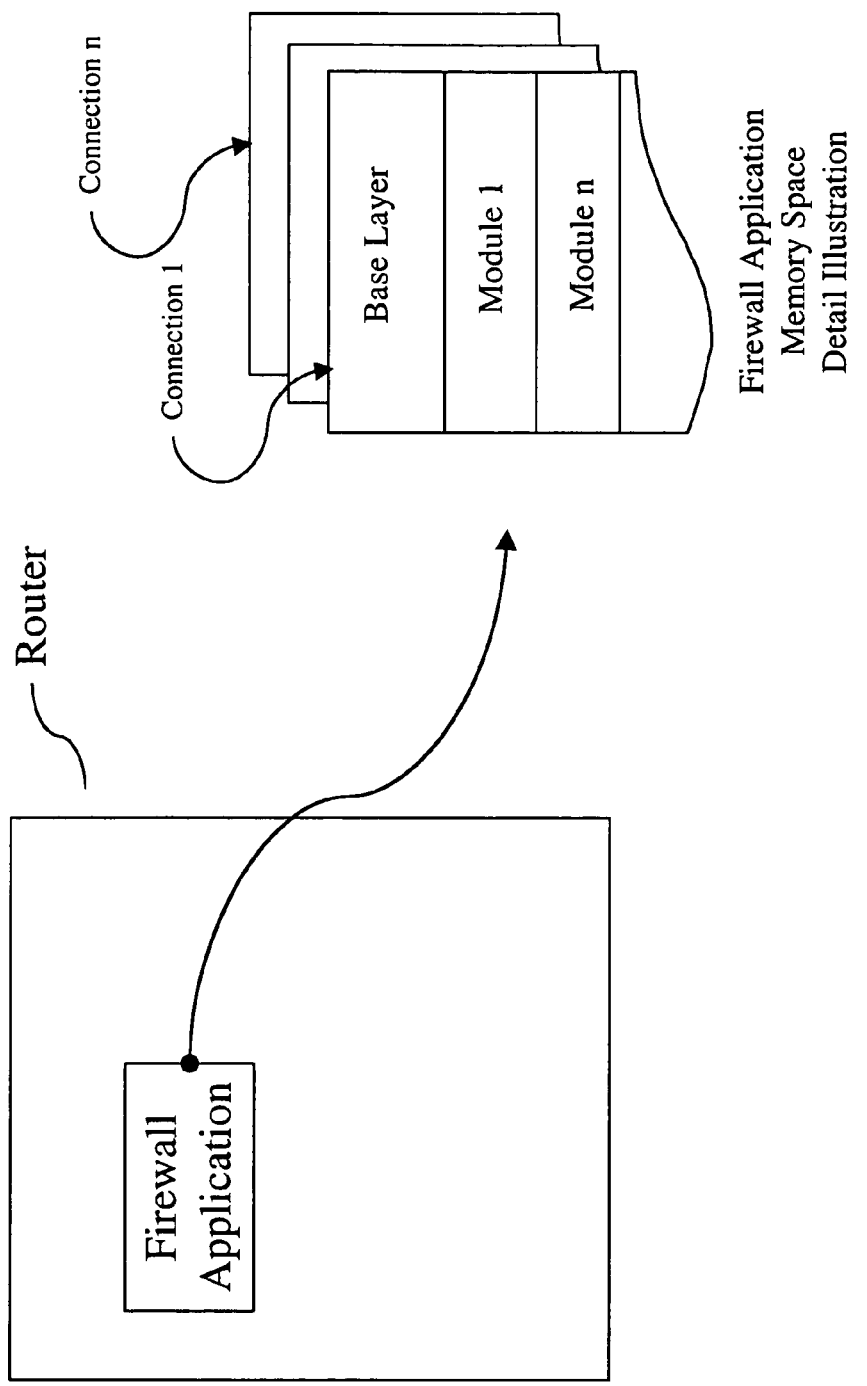
FIG. 4B is a prior art diagram of a router with a firewall running therein, and a detail illustration of a firewall application memory space.

During the process of the present invention, the firewall application of course has access to its memory space as shown in FIG. 4B to carry out functions during the normal operation of the firewall application.

As is appreciated by those of ordinary skill in the art, the checkpoint server memory space thus contains separate but interrelated data concerning an individual connection on the router. To facilitate recovery of this separate but interrelated data, each data is encoded with a unique connection identifier according to a process described below. Should a critical error occur within a process running within the router, such as the firewall crashing, the separate but interrelated data may be recovered and reassembled to become a complete connection data structure using the unique connection identifier according to a process described below.

Connection Recovery

The present invention also introduces the concept of reassembling separate but interrelated data using a unique connection identifier.

Figure 5B:
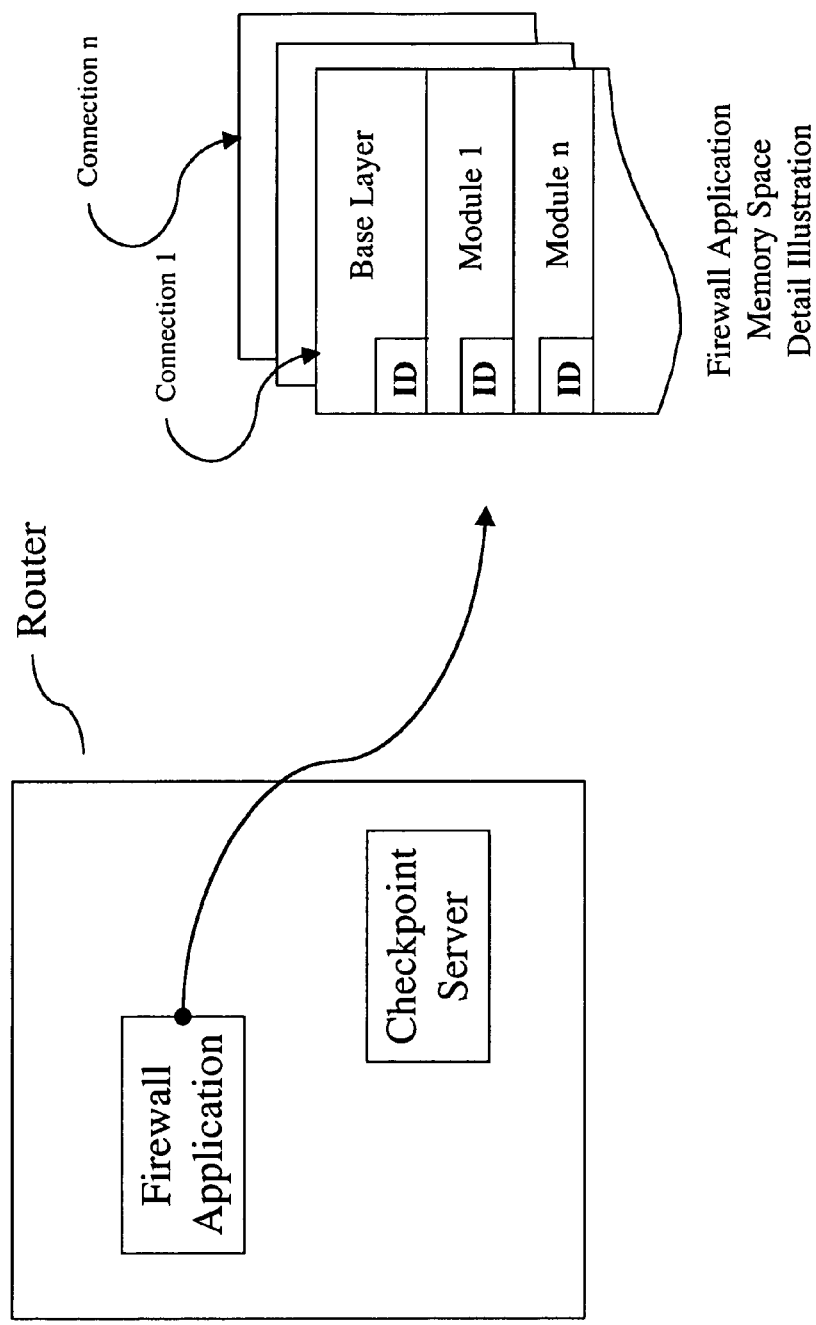
FIG. 5B is a diagram of connection recovery and a firewall application memory space detail illustration according to the present invention.

FIG. 5B shows the router and firewall application of FIG. 5A after the firewall application has been restarted as the result of a crash. According to the present invention, the firewall application will be instructed to look to the checkpoint server to see if there is any checkpointed data to recover. If there is, then the firewall application will copy the data from the checkpoint server shown in FIG. 5A, and reassemble the data for each existing connection by using the unique connection identifier stored within each module's data.

The result of the above process is shown in the firewall application memory space detail illustration of FIG. 5B. As will be appreciated by those of ordinary skill in the art, the data connection structure of FIG. 4 has been recovered through the use of the present invention. The data for each connection 1 though n running on the router has been reassembled into the firewall application's memory space by using the unique connection identifier to associate the various base layers with their respective modules 1 through n. Thus, separate but interrelated data has been reassembled using the benefits of the present invention as further described below.

The processes briefly described in FIGS. 5A and 5B will now be disclosed in more detail in the figures that follow.

Phase 1—Unique Checkpointing

New Connection

Figure 6:
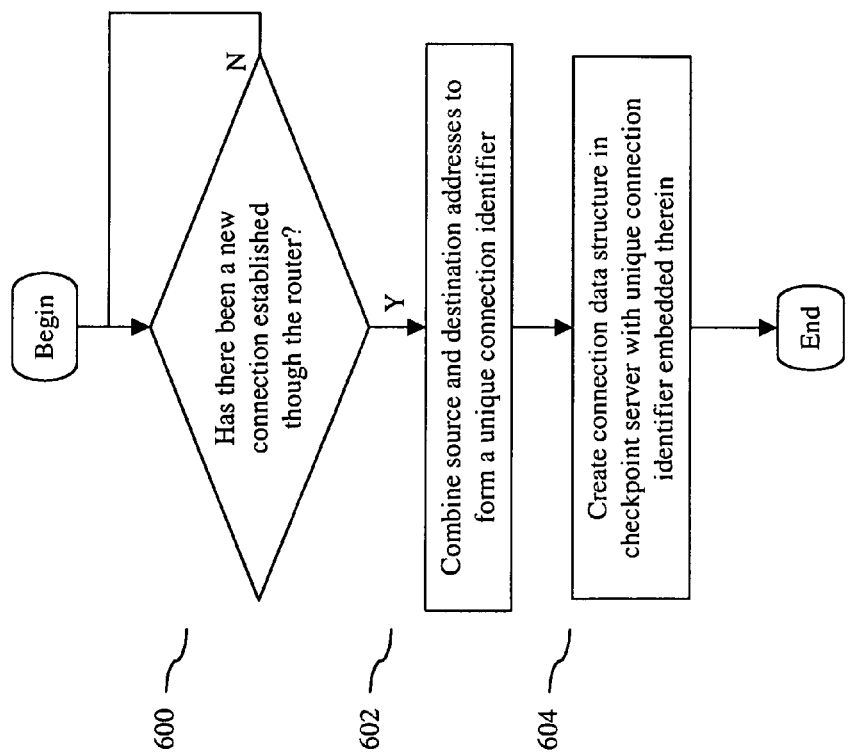
FIG. 6 is flowchart of a first aspect of unique checkpointing according to the present invention.

FIG. 6 is flowchart of the unique checkpointing process according to the present invention. The process shown in FIG. 6 occurs when a new connection is established on the router. In query 600, the process waits until a new connection has been established through the router, as shown by the loop coming from the no branch of query 600. In a non-limiting exemplary embodiment of the present invention, the firewall application waits for the connection, though it is contemplated that any application capable of performing the acts described herein may be employed.

If a new connection has been established in the router, a unique connection identifier will be formed in act 602. In a non-limiting exemplary example, a unique connection identifier is formed by the firewall application by combining the source and destination addresses of the packet being routed. As is known by those of ordinary skill in the art, these addresses may be retrieved from data contained within the packet. However, it is contemplated that any means for uniquely identifying a connection may be employed in the present invention.

Once the unique connection identifier has been created in act 602, then in act 604 a new connection data structure is created within the checkpoint server memory space by checkpointing the base layer of the connection and encoding therein the unique connection identifier. As defined herein, checkpointing is a process whereby critical data regarding the state of a connection through the router is stored such that the connection may be re-established using the checkpointed data. The data structure created in FIG. 6 is stored within the checkpoint server by any of the memory means described above. The process in FIG. 6 then ends after act 604, though the process may be repeated as often as necessary to satisfy the needs described herein.

In a non-limiting exemplary embodiment of the present invention, the firewall application accomplishes the checkpointing, though it is contemplated that any application capable of performing the acts described herein may be employed.

Module Checkpointing

Figure 7:
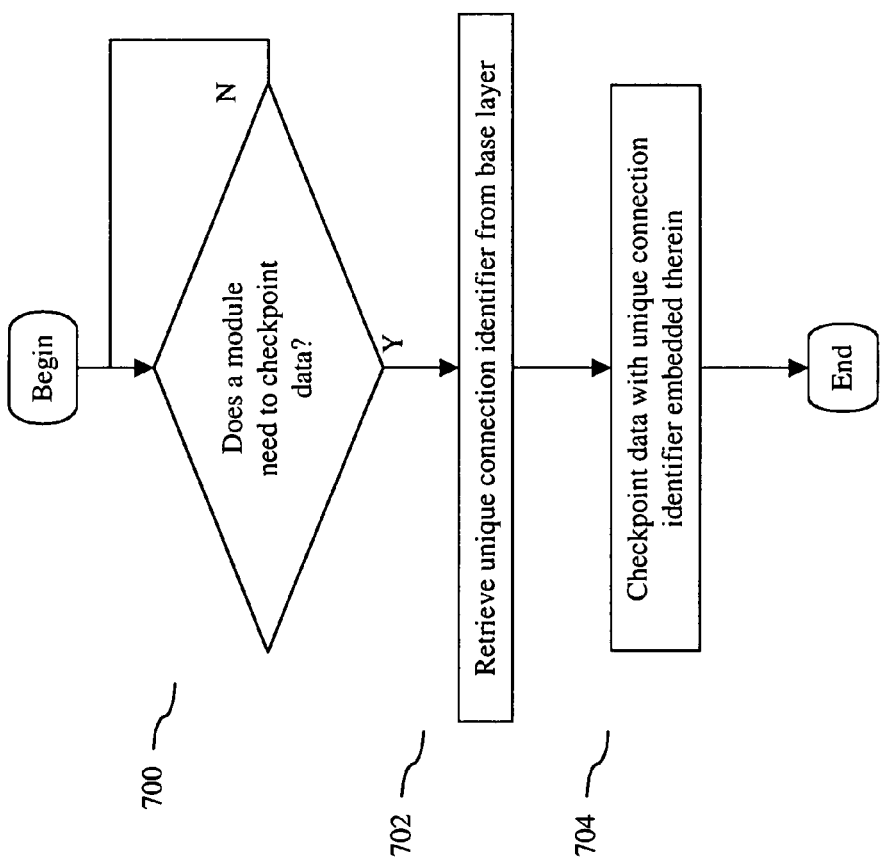
FIG. 7 is flowchart of a second aspect of unique checkpointing according to the present invention.

FIG. 7 is a flowchart of unique checkpointing according to the present invention. The process described in FIG. 7 occurs when a connection is processed by a module within the firewall application.

In query 700, the process waits until a module running within the firewall application needs to checkpoint its data, as shown by the loop coming from the no branch of query 700. As defined herein, a module may be any application of any layer that a particular connection may utilize in a particular session. As such, modules running in any layer of a particular session may be checkpointed, such as the layer 4 and layer 7 applications described above in the prior art section.

If a module needs to checkpoint data in query 700, then in act 702 the unique connection identifier for that connection created through the process described in FIG. 5 will be retrieved. In a preferred embodiment of the present invention, the firewall application will retrieve the unique connection identifier from the base layer corresponding to the particular connection.

Then, in act 704, the connection data structure corresponding to the particular connection will be embedded in the checkpointed data.

The process of FIG. 7 may be repeated for each new connection, or as often as necessary to satisfy the needs described herein. It is contemplated that depending on the type of protocol used by the applications making the connections, different application modules may participate in the checkpointing of the connection data structure.

State Change

Figure 8:
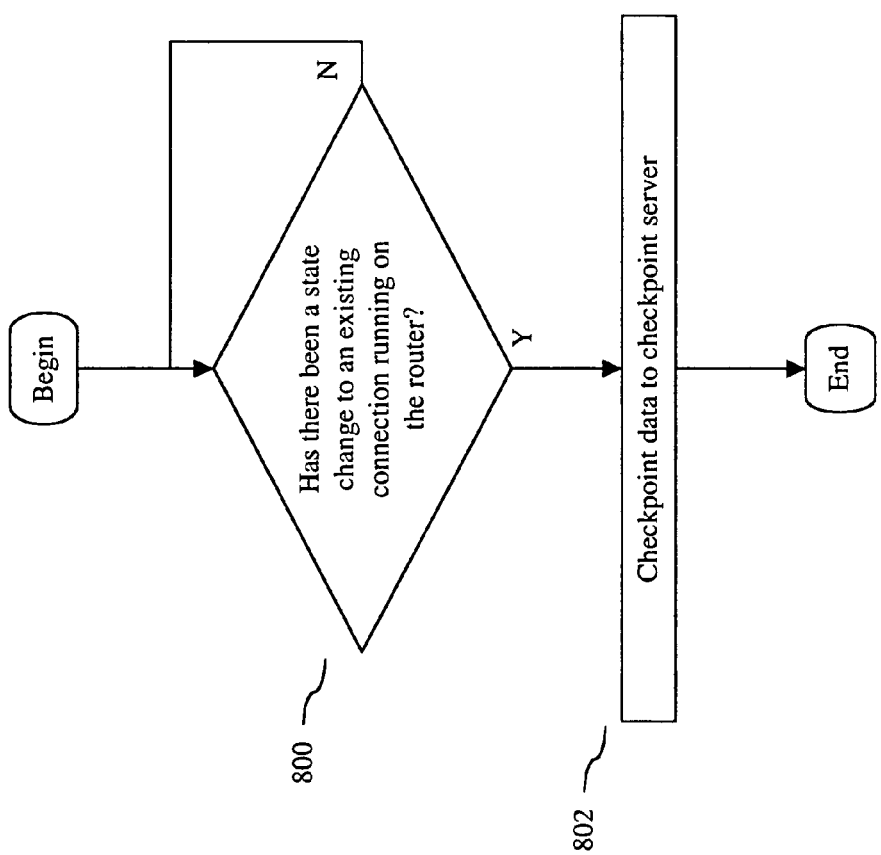
FIG. 8 is flowchart of a third aspect of unique checkpointing according to the present invention.

FIG. 8 is a flowchart of unique checkpointing according to the present invention. The process shown in FIG. 8 occurs when there has been a change of state within an existing connection.

In query 800, the process will wait until there has been a state change to an existing connection as shown by the loop coming from the no branch of query 800. In a non-limiting exemplary embodiment, this determination is performed within each individual application module.

If there has been a change to the state of an existing connection, then the relevant data for the particular connection is checkpointed by the responsible module to the checkpoint server in act 802. The process of FIG. 8 then ends, though the process may be repeated as often as necessary to satisfy the needs described herein.

Phase 2—Interrelated Data Recovery

Figure 9:
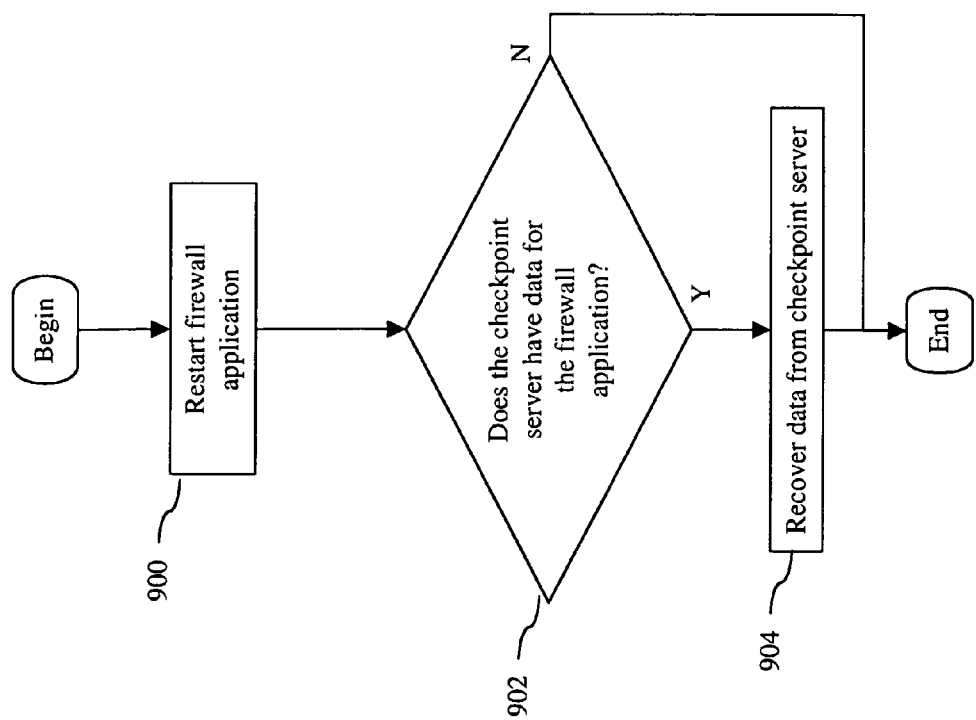
FIG. 9 is flowchart of a first aspect of separate but interrelated data recovery according to the present invention.

FIG. 9 is a flowchart of recovery of separate but interrelated data according to the present invention. In a non-limiting exemplary embodiment, the process disclosed in FIG. 9 is preformed by a firewall application running within a router. However, it is contemplated that the process of FIG. 9 may be performed by any application known in the art through which a connection has been established. Therefore, the discussion relating to a firewall should in no way be used to limit the scope of the present invention.

As is known by those of ordinary skill in the art, when a firewall application crashes and restarts, it will have no knowledge of the connection status of the router in which it is running. The processes disclosed in FIGS. 9 and 10 below disclose a process whereby an application running within a firewall application may recover such information.

Referring now to FIG. 9, in act 900, the system restarts the firewall application if it has crashed. In a non-limiting exemplary embodiment, this determination is made by the router server.

When the firewall application has been restarted, then in act 902 the firewall application will determine whether there is any data in the checkpoint server to recover. If there is no data in the checkpoint server, then the process in FIG. 9 ends. If there is data in the checkpoint server to recover, then the data contained within the checkpoint server is recovered in act 904.

In a non-limiting exemplary embodiment, the router server instructs the firewall application to perform the process described in FIG. 9. The firewall application then issues a query to the checkpoint server to determine whether there is any checkpointed data to be recovered.

Figure 10:
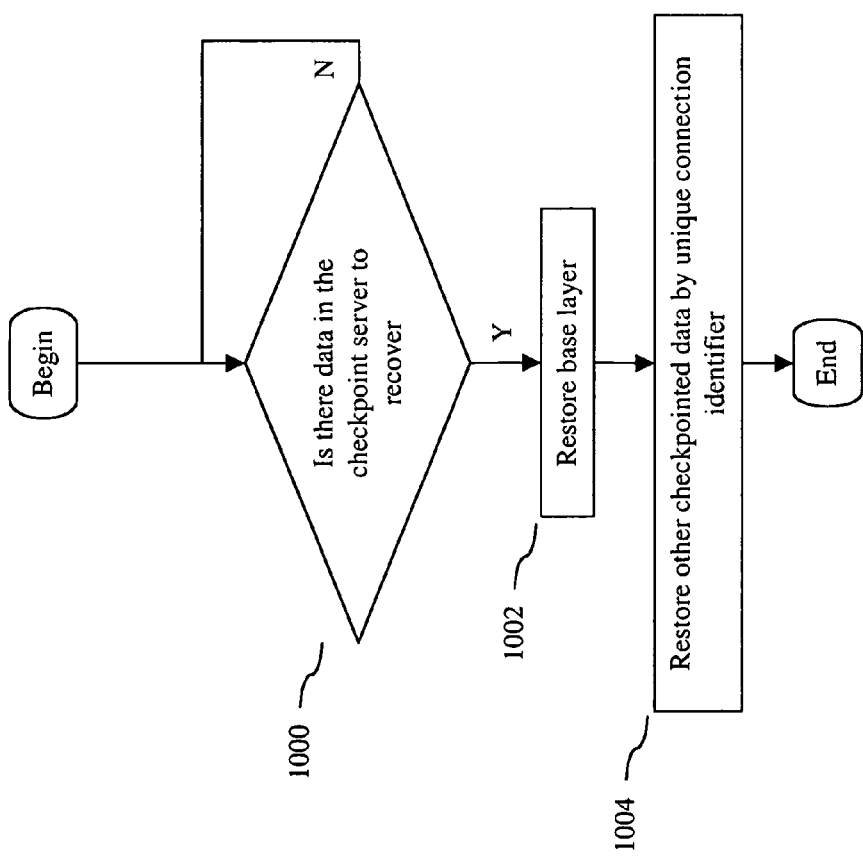
FIG. 10 is flowchart of a second aspect of separate but interrelated data recovery according to the present invention.

FIG. 10 is a flowchart of separate but interrelated data recovery according to the present invention.

In query 1000, the process of FIG. 10 waits until there is data within the checkpoint server to recover, as shown by the loop from the no branch of query 1000. In a non-limiting exemplary embodiment, this determination is made by the process disclosed in FIG. 9. In a preferred embodiment of the present invention, the result of query 1000 may be the result of the query issued by the firewall application to the checkpoint server as described above.

If there is data in the checkpoint to recover, then in act 1002 the base layer is recovered from the checkpoint server first.

Then after the base layer has been recovered from the checkpoint server in act 1002, other checkpointed data that is contained within the checkpoint server that contains the same unique connection identifier is then retrieved in act 1004. In a preferred embodiment of the present invention, recovery of the individual portions of a particular is performed by the relevant modules within the firewall application.

The process of FIG. 10 may be repeated for each connection recovered from the checkpoint server.

In a non-limiting exemplary embodiment, the firewall application is programmed to carry out the process described in FIG. 10. Thus, it is the firewall application that will re-assemble the data internally.

In another non-limiting exemplary embodiment, each module running on the router individually recover its corresponding checkpointed data, and reassembles the data using the unique connection identifier. In a preferred embodiment, each module will retrieve its portion of the connection data structure from its checkpoint area in the checkpoint server, and then add its portion to the connection data structure identified by the unique connection identifier. It is contemplated that many differing methods of retrieving checkpointed data from the checkpoint server may be used within the scope of the present invention.

As will be appreciated by those of ordinary skill in the art, by recovering data according to the unique connection identifier, connections may be re-assembled which then contain all relevant data to reconstruct a given connection on the router. In an exemplary experiment using the processes disclosed herein, a large file was transferred through a router which utilized a firewall application. When the firewall application was crashed during file transfer, the process disclosed herein was able to recover the connection and re-establish the file transfer with minimal perceptible delay to the end user.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method comprising;
   executing an application on a network device, the application having a plurality of modules each associated with one or more layers of a hierarchy of communication protocols;
   storing, in a memory space associated with the application, a connection data structure, the connection data structure storing together data for the plurality of modules of the application for a connection maintained by the network device;
   forming a unique connection identifier for the connection;
   independently checkpointing portions of the connection data structure for different modules into a memory space associated with a checkpoint server, the portions of the connection data structure each being embedded with the unique connection identifier and stored separately in the memory space associated with the checkpoint server; and
   in response to a restart or failure of the application executing on the network device, restoring the connection data structure in the memory space associated with the application, by retrieving the separately stored portions of the connection data structure for at least some of the different modules from the memory space associated with a checkpoint server and combining them to reform the connection data structure in the memory space associated with the application.

2. The method of claim 1, wherein the independently checkpointing comprises:
   determining for each module of the plurality of modules when the module requires a checkpoint of the module's portion of the connection data structure; and
   in response to the determining a particular module requires a checkpoint, checkpointing the particular module's portion of the connection data structure into the memory space associated with the checkpoint server.

3. The method of claim 1, wherein the independently checkpointing comprises:
   determining there has been a state change of the connection; and in response to the state change, checkpointing at least one particular module's portion of the connection data structure into the memory space associated with the checkpoint server.

4. The method of claim 1, wherein the independently checkpointing is performed individually by each module, such that each module checkpoints its own portion of the connection data structure, and the retrieving is performed individually by each module, such that each module retrieves its own portion of the connection data structure.

5. The method of claim 1, wherein the application is a firewall application and the plurality of modules are modules within the firewall application.

6. The method of claim 1, wherein the forming a unique connection identifier for the connection comprises:
combining a source address and a destination address of a packet associated with the connection.

7. The method of claim 1, wherein the plurality of modules include at least a module associated with Transmission Control Protocol (TCP), User Datagram Protocol (UDP), or File Transfer Protocol (FTP).

8. The method of claim 1 wherein a separate connection data structure is maintained for each connection of a plurality of connections maintained by the network device.

9. The method of claim 1, further comprising:
executing the checkpoint server on the network device along with the application, and wherein the memory space associated with the checkpoint server is memory space provided by the network device separate from the memory space associated with the application.

10. The method of claim 1, further comprising:
executing the checkpoint server on a device other than the network device executing the application.

11. An apparatus comprising:
a microprocessor configured to execute an application and a checkpoint server, the application having a plurality of modules each associated with one or more layers of a hierarchy of communication protocols;
a memory having a memory space associated with the application and having a separate memory space associated with the checkpoint server; and
the microprocessor further configured to execute instructions to store a connection data structure that holds together data for the plurality of modules of the application related to a particular connection maintained by the apparatus, to form a unique connection identifier for the connection, to independently checkpoint portions of the connection data structure for different modules into the memory space associated with the checkpoint server where the portions are each embedded with the unique connection identifier yet stored separately, and to restore, in response to a restart or failure of the application, the connection data structure into the memory space associated with the application, by retrieval of the separately stored portions of the connection data structure for at least some of the different modules from the memory space associated with a checkpoint server and reassembly of the portions to reform the connection data structure in the memory space associated with the application.

12. The apparatus of claim 11, wherein the instructions to independently checkpoint comprise instructions to determine for each module of the plurality of modules when the module requires a checkpoint of the module's portion of the connection data structure and to, in response to determination a particular module requires a checkpoint, checkpoint the particular module's portion of the connection data structure into the memory space associated with the checkpoint server.

13. The apparatus of claim 11, wherein the instructions to independently checkpoint comprise instructions to determine there has been a state change of the connection, and to, in response to the state change, checkpoint at least one particular module's portion of the connection data structure into the memory space associated with a checkpoint server.

14. The apparatus of claim 11, wherein the application is a firewall application and the plurality of modules are modules within the firewall application.

15. The apparatus of claim 11 wherein the instructions to form the unique connection identifier for the connection comprise instructions to combine a source address and a destination address of a packet associated with the connection.

16. The apparatus of claim 11 wherein the plurality of modules include at least a module associated with Transmission Control Protocol (TCP), User Datagram Protocol (UDP), or File Transfer Protocol (FTP).

17. The apparatus of claim 11 wherein a separate connection data structure is maintained for each connection of a plurality of connections maintained by the apparatus.

18. A system comprising;
a network device with a microprocessor configured to execute an application, the application having a plurality of modules each associated with one or more layers of a hierarchy of communication protocols, the network device further configured to store in a memory space associated with the application a connection data structure, the connection data structure maintaining together data for the plurality of modules of the application for a connection maintained by the network device, the network device further configured to independently checkpoint portions of the connection data structure for different modules; and
a checkpoint server configured to store in an associated memory space the independently checkpointed portions of the connection data structure, the portions of the connection data structure each being embedded with a unique connection identifier associated with the connection and stored separately in the memory space associated with the checkpoint server, the checkpoint server configured to, in response to a restart or failure of the application executing on the network device, restore at least a part of the connection data structure to the memory space associated with the application, by retrieval of the separately-stored portions of the connection data structure for at least some of the different modules from the memory space associated with a checkpoint server and reassembly of the portions to reform the at least a part of the connection data structure in the memory space associated with the application.

19. The system of claim 18, wherein the checkpoint server is further configured to determine for each module of the plurality of modules when the module requires a checkpoint of the module's portion of the connection data structure, and to, in response to determination that a particular module requires a checkpoint, checkpoint the particular module's portion of the connection data structure into the memory space associated with the checkpoint server.

20. The system of claim 18, wherein the checkpoint server is further configured to determine there has been a state change of the connection, and in response to the state change, checkpoint at least one particular module's portion of the connection data structure into the memory space associated with the checkpoint server.

* * * * *